United States Patent
Stacy

[19]

[11] Patent Number: 6,094,870
[45] Date of Patent: Aug. 1, 2000

[54] LOCKING DEVICE FOR SLIDE-OUT ROOMS

[75] Inventor: Randall W. Stacy, Granger, Ind.

[73] Assignee: QC Metal Fab, Inc., Elkhart, Ind.

[21] Appl. No.: 09/084,560

[22] Filed: May 26, 1998

Related U.S. Application Data

[60] Provisional application No. 60/050,793, Jun. 26, 1997.

[51] Int. Cl.[7] .............................. E04B 1/346; E04B 7/16
[52] U.S. Cl. ................................ 52/67; 52/126.5; 296/26; 296/175
[58] Field of Search .................. 52/67, 126.1, 127.2, 52/126.7, 126.5; 296/26.03, 26.08, 26.09, 26.12, 26.13, 171, 175, 26; 254/100

[56] References Cited

U.S. PATENT DOCUMENTS

| | | | |
|---|---|---|---|
| 2,270,014 | 1/1942 | Walraven | 254/100 |
| 5,491,933 | 2/1996 | Miller et al. | 52/67 |
| 5,577,351 | 11/1996 | Dewald, Jr. et al. | 52/67 |
| 5,586,802 | 12/1996 | Dewald, Jr. et al. | 296/26 |
| 5,607,134 | 3/1997 | Corning et al. | 248/354.3 |
| 5,620,224 | 4/1997 | Bibiagio et al. | 296/26 |
| 5,732,839 | 3/1998 | Schimmang et al. | 220/1.5 |
| 5,758,918 | 6/1998 | Schneider et al. | 296/26 |
| 5,788,306 | 8/1998 | Dibiagio et al. | 296/26.02 |
| 5,791,715 | 8/1998 | Nebel | 296/26 |
| 5,857,733 | 1/1999 | Dewald, Jr. et al. | 296/175 |
| 5,915,774 | 6/1999 | Tiedge | 296/26.13 |

*Primary Examiner*—Carl D. Friedman
*Assistant Examiner*—Yvonne M. Horton
*Attorney, Agent, or Firm*—Baker & Daniels

[57] ABSTRACT

A locking device which locks the slide-out room of mobile living quarters in the retracted position when the mobile living quarters is moved includes inner and outer tubular members which extend between parallel bulkheads on the main living area and the slide-out room. A handle is moved over center between latched and unlatched positions. In the latched position, the inner member is extended from the outer member to force the bulkheads apart, thereby causing a portion of the outer wall to slide-out room to engage the bulkhead on the main living area to affect sealing therebetween. In the unlatched position, the inner member is retracted into the outer member, thereby permitting removal of the locking device from the slide-out room.

19 Claims, 4 Drawing Sheets

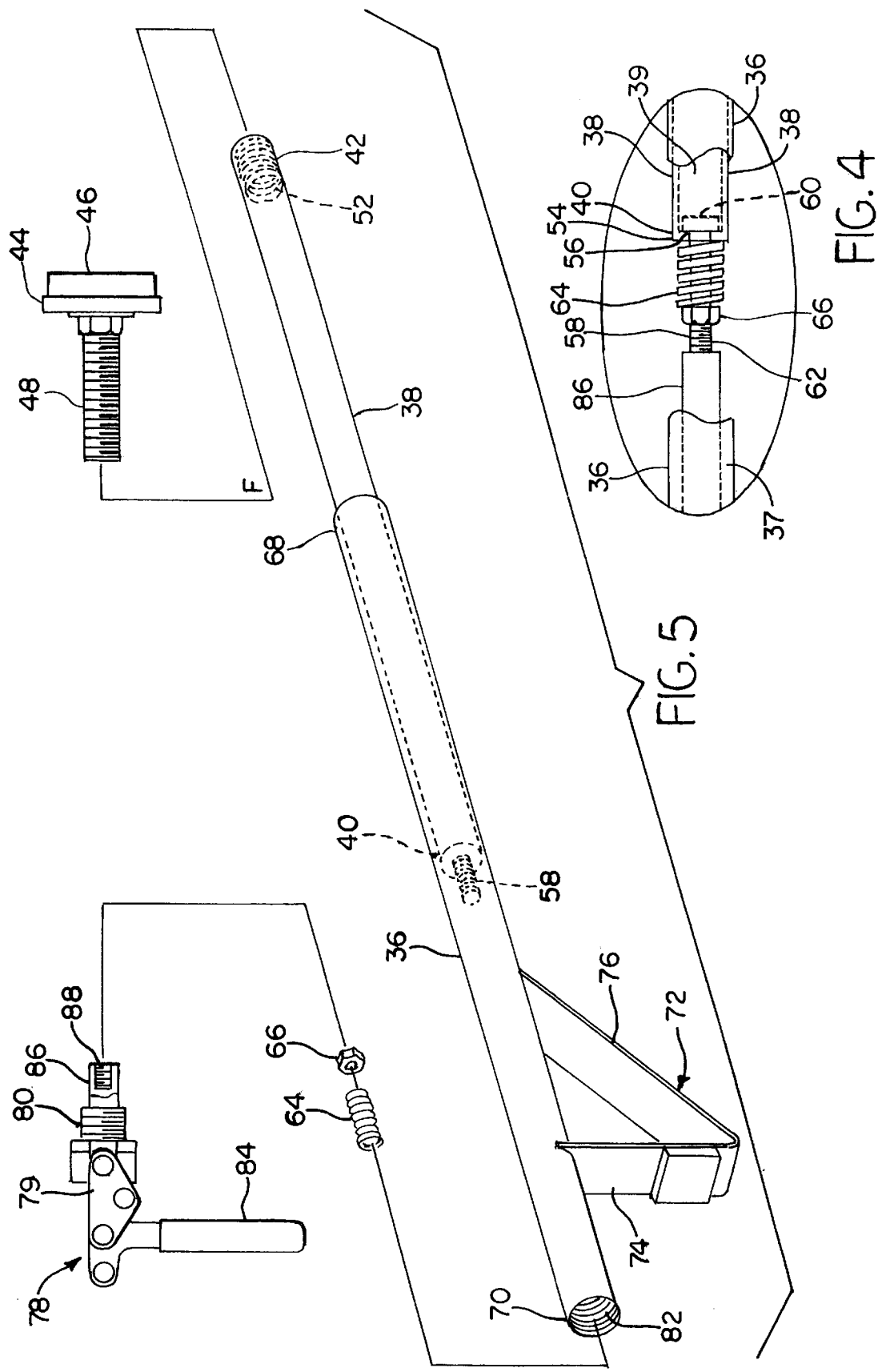

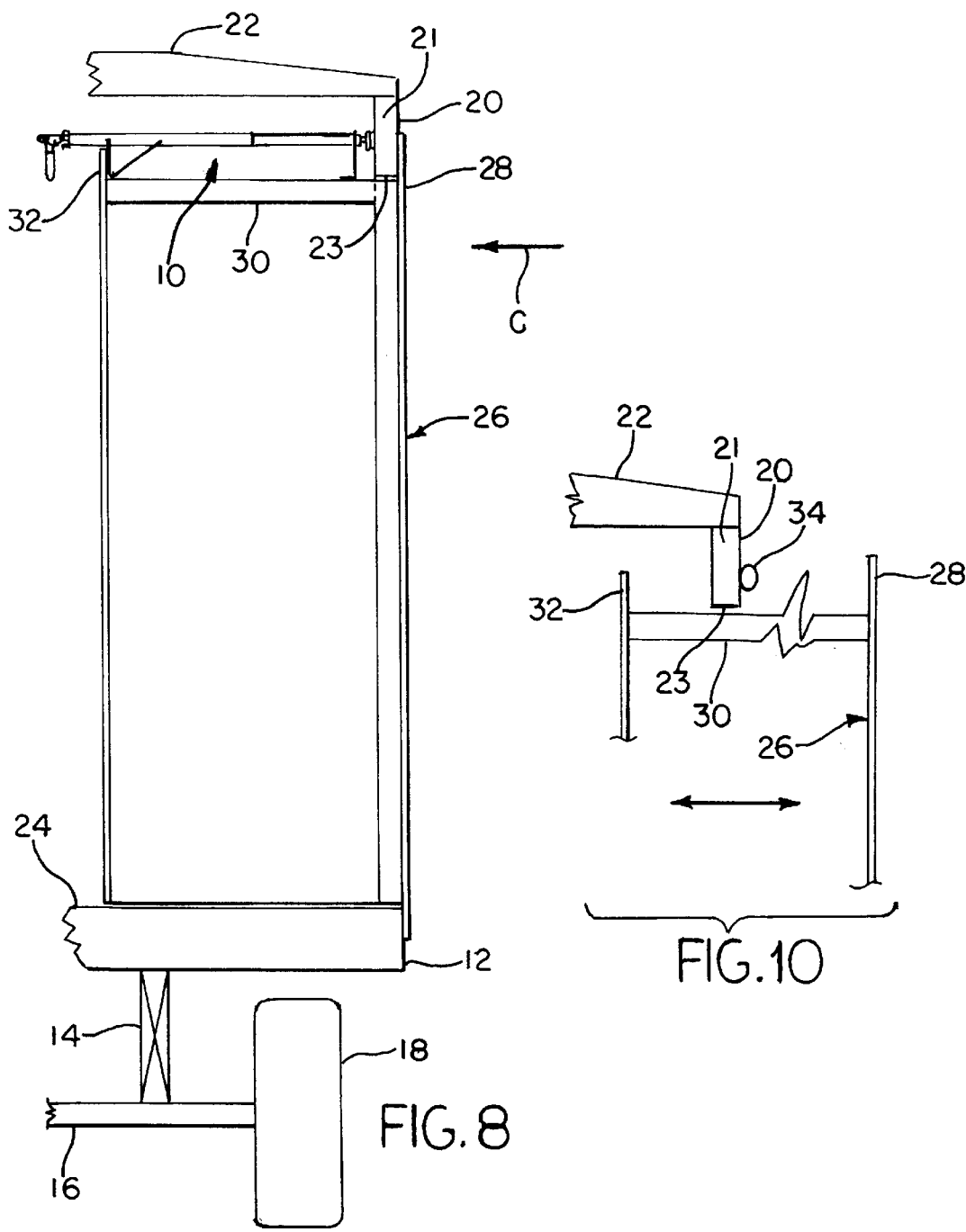
FIG. 8
FIG. 10
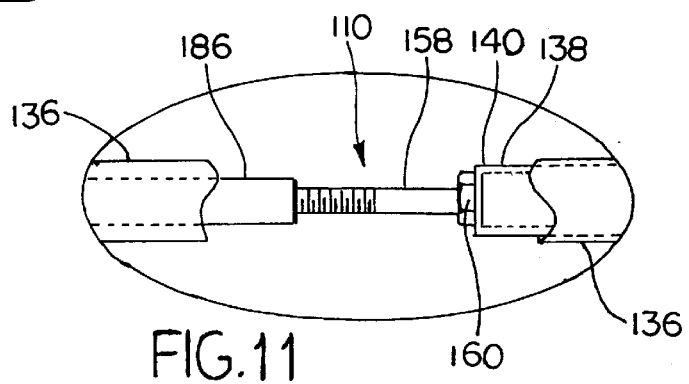
FIG. 11

LOCKING DEVICE FOR SLIDE-OUT ROOMS

This application claims domestic priority based upon U.S. Provisional Application Ser. No. 60/050,793.

The present invention relates to a locking bar for use on a recreational vehicle having a slide-out room. When the slide-out room is retracted into the main living quarters of a recreational vehicle such as during travel, the locking bar prevents inadvertent movement between the slide-out room and the recreational vehicle.

BACKGROUND AND SUMMARY OF THE INVENTION

The width of recreational vehicles is effectively limited by the width of public roads. Accordingly, it is increasingly common to provide recreational vehicles or even a manufactured home with a slide out room which can be retracted into the main living quarters when the product is being moved or driven, but which can be extended from the main living quarters to provide auxiliary living space when the unit is parked for use or when the manufactured home is assembled at the home site. Because the interface between the slide out room and the main living quarters provides a path through which rain, dust and other environmental contaminants may enter the unit, a flexible rubber seal or other compressible seal is typically provided between the outer wall of the slide out room and the structure defining the main living quarters. The seal prevents the ingress of water through the interface between the slide out room and the main living quarters when the room is retracted. Such a seal is especially necessary during travel, because wind-driven rain, moisture, dirt or other contaminants can easily penetrate the interface between the slide out room and the main living quarters as the product travels over the roadway.

Unfortunately, when the vehicle encounters turns or bumps in the roadway, the vehicle rocks and sways. This rocking or swaying motion causes the slide out room to move slightly relative to the main living quarters. When this happens, the movement of the room relative to the main living quarters momentarily pulls the top and the sides of the slide out room away from the compressible seal, and thus creates an avenue of ingress for wind-driven moisture, dirt and other contaminants. Accordingly, there exists a need for a device that prevents the ingress of water and other contaminants by maintaining the integrity of the seal between the slide out room and the main living quarters.

The present invention provides a mechanism for quickly and easily locking the slide out room in the retracted position within the main living quarters of the vehicle or housing product, and provides enough force so that the slide out room is firmly compressed against the compressible seal which thus eliminates any possible leakage. The device includes a telescoping rod having an outer member and an inner member that is slidably disposed within the outer member. The rod is placed so that rod outer end abuts the inner face of the outer wall of the main living quarters and the inner end abuts the outer face of the header board or bulkhead that runs along the top surface of the slide out room's inner edge. The inner end of the rod includes a locking handle which is an over center actuator device used to extend or retract the rod. When the rod is extended, the force exerted by the rod against the inner face of the header board pushes the top edge of the room towards the interior of the vehicle. This forces the top edge of the slide out room outer wall into contact with the outer wall of the vehicle, which compresses the seal at the interface. Thus, even when the vehicle encounters turns or rough roads, the locking device maintains the side and top walls of the slide out room in contact with the compressible seal that extends around the interface between the main structure and the slide out room.

Accordingly, it is an object of this invention to provide a locking device for use on a recreational vehicle or a manufactured house equipped with a slide out room.

It is another object of this invention to provide a locking device that maintains the integrity of the seal between a slide out room and the main body of a recreational vehicle while the vehicle is being transported.

A further object of this invention is to provide a locking device for slide out rooms that is easy to adjust and easy to install.

These and other objects of the invention will become readily apparent to those skilled in the art upon a reading of the following description.

BRIEF DESCRIPTION OF THE DRAWINGS

FIG. 4 is an enlarged fragmentary view of the circumscribed portion of FIG. 3 showing the internal transition spring;

FIG. 5 is a fragmentary exploded view, partly in perspective, of the present locking device shown with the actuator mechanism removed from the inner end and the adjustable foot removed from the outer end;

FIG. 8 is a fragmentary cross-sectional view of the present locking device shown installed in a recreational vehicle having a slide out room which has been placed in the retracted position;

FIG. 10 is a fragmentary cross-sectional view similar to that shown in FIG. 8 in which the slide out room which has been placed in a partially extended position; and FIG. 11 is an enlarged fragmentary view of a second embodiment which is similar to the embodiment of FIGS. 1 through 9 but which incorporates a solid connection between the plunger mechanism and the inner member.

DETAILED DESCRIPTION OF THE INVENTION

The embodiments herein described are not intended to be exhaustive or to limit the invention to the precise forms disclosed. They are chosen and described to explain the principles of the invention and its application and practical use to best enable other skilled in the art to follow its teachings.

Figure 9:
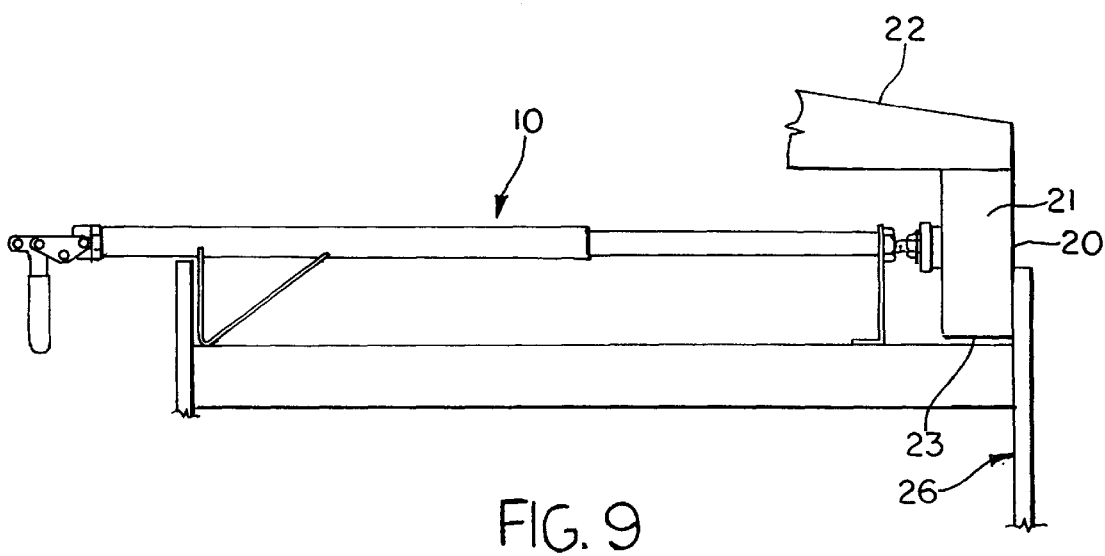
FIG. 9 is an enlarged fragmentary view taken from the circumscribed portion of FIG. 8 showing the locking device extending between the inner surface of the outer bulkhead and the interior header board or bulkhead of the slide out room.

Referring now to the drawings, FIGS. 8 and 9 show a locking device incorporating the features of the present invention which is generally indicated by the reference numeral 10 and which is shown installed on a typical recreational vehicle 12. The vehicle 12 typically includes a frame 14 supported on axle 16 having a pair of wheels, one of which is shown as at 18. The vehicle 12 also includes a plurality of exterior sidewalls 20 (only one shown), a roof 22 and a floor 24. One of the sidewalls 20 includes an outer bulkhead 21 which defines in part an opening 23 in sidewall 20. The vehicle 12 further includes a slide out room 26, which is slidably disposed within the opening 23 and which is shiftable between the retracted position as shown in FIG. 8 and an extended position in order to increase the available living space inside vehicle 12. Room 26 slides back and forth on a support system (not shown) as is common in the industry. Slide out room 26 includes an outer wall 28, a frame 30, and an inner bulkhead 32 as is common in the industry. As is shown in FIGS. 9 or 10, a compressible seal 34 lies at the interface between vehicle 12 and the outer wall 28 of slide out room 26.

Figure 7:
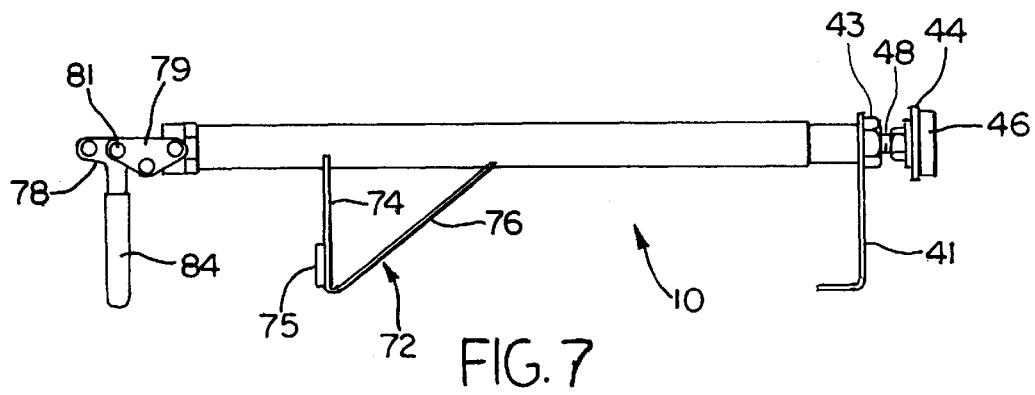
FIG. 7 is an elevational view of the present locking device shown with an optional standoff attachment.

Referring now to FIGS. 1 through 5, locking device 10 is telescopic and includes an outer tubular member 36 having an internal cavity 37, and an inner tubular member 38 having an internal cavity 39. Member 36 is preferably manufactured from drawn over mandrel (DOM) tubing as is commonly available in the industry, while member 38 is preferably constructed of schedule 40 galvanized steel pipe as is commonly available in the industry. Member 36 is also preferably painted or powder coated to prevent rust and/or corrosion. Inner member 38 includes an inner end 40 and an outer end 42, and is disposed so that its end 40 is disposed within the cavity 37 defined by outer member 36 as shown in FIG. 5. An adjustable foot 44 having a rubber pad 46 and a threaded shaft 48 is attached to end 42 of inner member 38. Threaded shaft 48 engages a set of threads 52 tapped in the end 42 of inner member 38. As shown in FIG. 7, locking device 10 may also include a standoff bracket 41, which is attached to end 42 of inner member 38 and is secured by a lock nut 43. The standoff bracket 41 supports the end of inner member 42 before foot 44 is forced against bulkhead 20 by operation of handle.

Referring now to FIG. 4, a collar member or washer 54 is welded or otherwise secured across the end 40 of inner member 38. A threaded bolt 58 having a head 60 extends through washer 54 with its head 60 abutting the washer internally of inner member 38. A helical coil spring 64 is placed on shaft 62 and is secured in slight compression by an adjustable nut 66 turned upon the shaft.

Referring now to FIGS. 1, 2, 3 and 5, outer member 36 includes ends 68, 70. A brace or right angled bracket 72 having a pair of legs 74, 76 is welded or otherwise secured to outer member 36 near end 70. A rubber pad 75 is glued, bonded or otherwise secured to leg 74 of bracket 72 so that pad 75 faces towards end 70. An actuator 78 is secured to end 70 of outer member 36. This is accomplished by providing the body 77 of the actuator with an axial bore and surrounding male threads 80 turned into a set of female threads 82 tapped in end 70 of outer member 36. Actuator 78 is an over-center mechanism and includes a handle 84 which is located between bracket plates 79. A pin 81 connects handle 84 to plates 79 for movement between the unsecured and secured positions shown in FIGS. 2 and 3. A reciprocating shaft 86 extends with substantial clearance through the base in actuator body 77 and is pivotally connected at one end to and between spaced feet 85 of handle 84. The opposite end of shaft 86 is internally threaded at 88. Internal bolt 58 connected to inner member 38 is turned into threads 88 of shaft 86.

Figure 1:
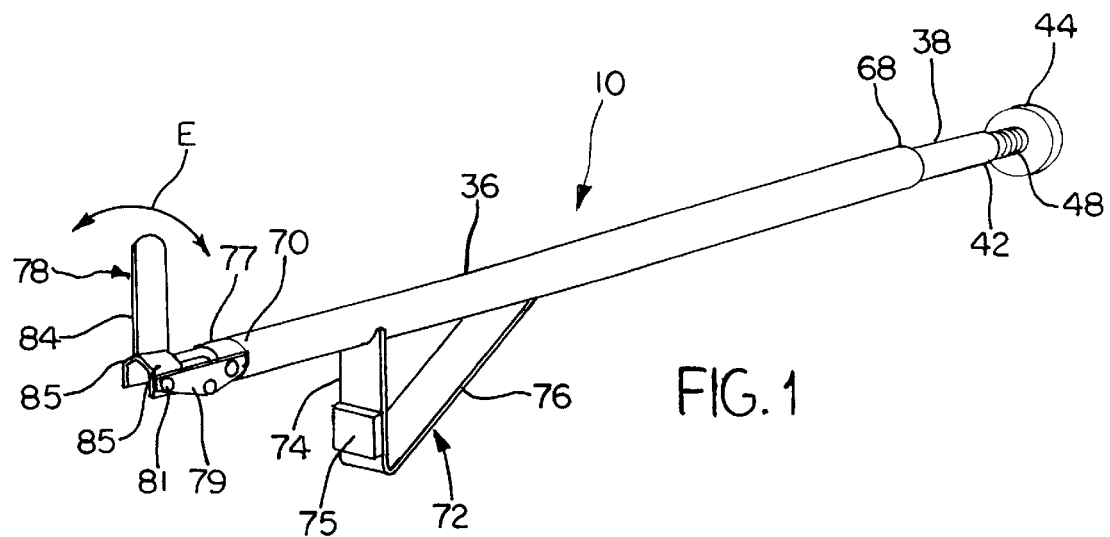
FIG. 1 is a perspective view of the locking device according to the present invention.
Figure 2:
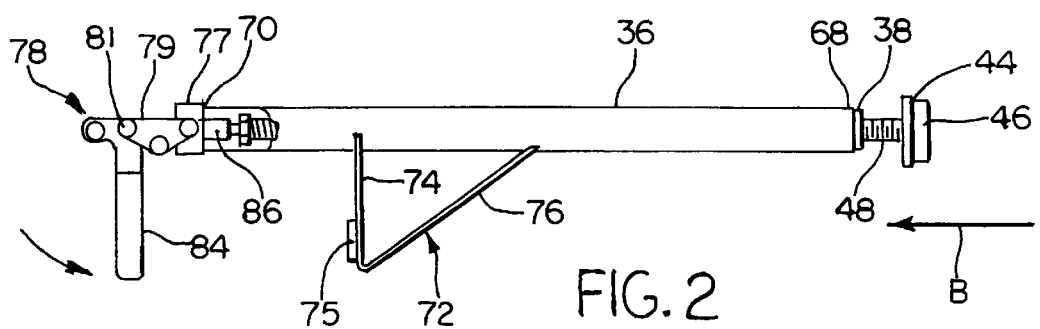
FIG. 2 is an elevational view of the locking device of FIG. 1 shown with the bar in its retracted position.
Figure 3:
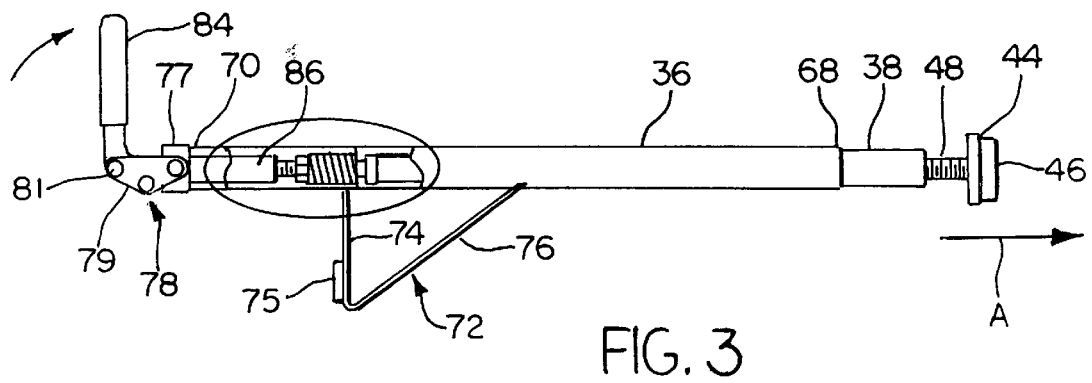
FIG. 3 is an elevational view of the locking device of FIGS. 1 and 2 shown with the rod in its extended position.
Figure 6:
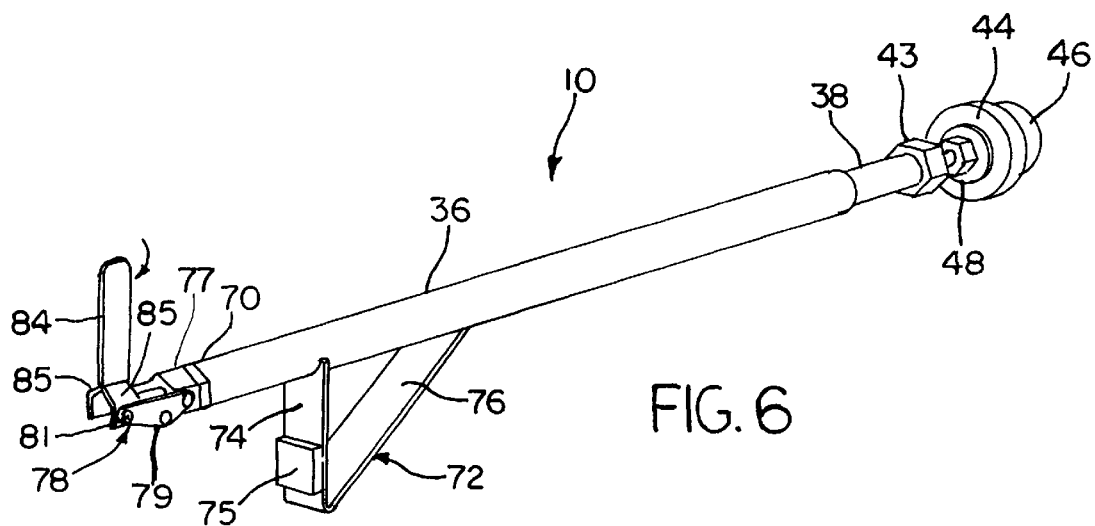
FIG. 6 is a perspective view of the present locking device shown with an optional lock nut on the outer end.

Handle 84 of actuator 78 is shiftable between the secured position shown in FIG. 3, in which shaft 86 is extended away from body 77 of the actuator 78, and the unsecured over-center position shown in FIG. 2 in which the shaft 86 is retracted. Thus, with the handle 84 of actuator 78 in the secured position shown in FIG. 3, inner member 38 having foot 44 attached is forced in the outward direction as indicated by the reference arrow "A", thus effectively lengthening locking device 10. By virtue of the compressiveness of spring 64, the connection between outer member 36 and inner member 38 has certain limited resilience. Conversely, when the handle 84 of device 78 is shifted to the unsecured position shown in FIG. 2, shaft 86 is pulled rearwardly by the handle, retracts, and pulls inner member 38 inwardly in the direction indicated by the reference arrow "B", such that inner member 38 is retracted and drawn into outer member 36 thus effectively shortening locking device 10. The clearance of shaft 86 within the bore of actuator body 77 allows sufficient internal movement of the shaft as it shifts rearwardly and forwardly to prevent binding.

In operation, after the slide out room 26 of vehicle 12 has been shifted to the retracted position shown in FIG. 8, the locking device 10 is positioned so that outer end 42 of inner member 38 having adjustable foot 44 attached thereto abuts the inner surface of main living quarters outer bulkhead 21. End 70 of outer member 36 is positioned so that bracket 72 abuts the inner surface of slide out room bulkhead 32. Foot 44 then is turned outwardly to extend the foot to take up any slack. Preferably, standoff bracket 41, if used, and bracket 72 rest on the top of slide out room 26, thus easing the placement and adjustment of locking device 10. To fully engage the locking device 10, the user then shifts the handle 84 of actuator 78 from the unsecured position shown in FIG. 2 towards the secured position shown in FIG. 3, which extends shaft 86 and forces inner member 38 to be extended in the direction indicated by reference arrow "A" in FIG. 3, thus lengthening locking device 10. As locking device 10 extends, the force of bracket 72 against inner bulkhead 32 forces outer wall 28 inwardly in the direction indicated by reference arrow "C" in FIG. 8, which pulls outer wall 28 firmly against the outer face of bulkhead 21 of side wall 20, thus compressing seal 34. Referring again to FIG. 4, the extension of shaft 86 compresses spring 64 which causes bolt head 60 to slide slightly relative to inner member 38 and which in abutting washer 54 causes foot 44 to be forcedly biased against bulkhead 21. The resilient connection provided by spring 64 thus allows greater flexibility in adjusting the overall length of locking device 10. The user can adjust the orientation of handle 84 by rotating handle 84 through its threaded connection to outer member 36 about an axis parallel to the longitudinal axis of locking device 10 as shown by arrow E in FIG. 1. Thus, the handle 84 can be pivoted from only convenient angular position when placed in operative location.

FIG. 11 shows an alternate embodiment for the present invention in which the elements are substantially the same as those in the embodiment previously described. Locking device 110 includes a telescopic tubular outer member 136 and an inner telescopic tubular member 138. Inner member 138 is disposed so that its inner end 140 is disposed within outer member 136. A threaded bolt 158 having a bolt head 160 is welded or otherwise rigidly secured to end 140 of inner member 138. Accordingly, any axial movement of interconnected shaft 186 by a handle (not shown, but which is similar to the handle employed in the embodiment of FIGS. 1 through 10) causes a corresponding axial movement of inner member 138.

What is claimed:

1. In combination, mobile living quarters having a main living area and a slide out room extendible to provide an auxiliary living area when the mobile living quarters is parked for use but retractable into the main living area when the mobile living quarters is moved, said main living area and said slide out room each including bulkheads extending parallel to one another, the bulkhead on the slide out room moving toward and away from the bulkhead on the main living area as the slide out room is extended and retracted, one side of said bulkhead on the main living area engaging a corresponding portion of the slide out room when the slide out room is in the retracted position, and a locking device extending between said bulkheads for forcing said bulkheads apart to thereby move said portion against said one side of the bulkhead on the main living area when the slide out room is in the retracted position, said locking device including an outer tubular member, an inner tubular member slidable within the outer tubular member, and a handle movable between latched and unlatched positions to move said inner member relative to said outer member.

2. The combination as claimed in claim 1, wherein a compressible seal is disposed between said portion and the one side of said bulkhead on the main living area, said seal being compressed upon movement of the handle to the latched position.

3. The combination as claimed in claim 1, wherein said handle is mounted on said outer member and operates a plunger slidable within said outer member as said handle is moved between the latched and unlatched positions, said plunger engaging said inner member and being responsive to movement of the handle to the latched position to move the inner member outwardly from said outer member.

4. The combination as claimed in claim 3, wherein said plunger includes a spring, said spring engaging said inner member to form a yieldable connection therebetween.

5. The combination of claim 3, wherein said handle is connected to said outer member for movement about a first pivot connection, said handle being connected to said plunger for movement about a second pivot connection offset from the first pivot connection.

6. The combination of claim 3, wherein said handle is connected to said outer member for movement about a first pivot connection, said handle being connected to said plunger for movement about a second pivot connection offset from the first pivot connection to permit movement of said second pivot connection from a position in which the first pivot connection is disposed between the second pivot connection and the plunger when the handle is in the unlatched position to an overcenter position in which the second pivot connection is between the first pivot connection and the plunger when the handle is moved to the latched position.

7. The combination of claim 6, wherein said first pivot connection pivotally connects said handle to a pair of plates extending from one end of the outer member, said plunger extending between said plates.

8. The combination of claim 3, wherein said handle is mounted on one end of said outer member, said inner member extending from the other end of said outer member for engagement with a corresponding one of said bulkheads.

9. The combination of claim 8, wherein a foot extends from said inner member for engagement with said one bulkhead, said foot being secured to said inner member via an adjustable connection whereby the length of said locking device may be adjusted to adjust the fit of the locking device between said bulkheads.

10. The combination of claim 9, wherein a bracket is mounted on said outer tubular member for engagement with the other bulkhead.

11. The combination of claim 8, wherein a bracket is mounted on said outer tubular member for engagement with the other bulkhead.

12. The combination as claimed in claim 1, wherein said locking device is removable.

13. A locking device for clamping a slide out room auxiliary living area against a main living area of mobile living quarters when the slide out room auxiliary living area is retracted into the main living area comprising an outer tubular member having a bracket for engagement with one of said living areas, an inner tubular member for engagement with the other living area, said inner member being slidable within the outer member, and a handle movable between a latched position extending said inner tubular member to thereby lengthen the locking device to clamp the slide out room to the main living area to an unlatched position retracting the inner member to shorten the locking device to permit removal of the locking device.

14. The locking device as claimed in claim 13, wherein said handle is mounted on said outer member and operates a plunger slidable within said outer member as said handle is moved between the latched and unlatched positions, said plunger engaging said inner member and being responsive to movement of the handle to move the inner member outwardly from said outer member when the handle is moved to the latched position.

15. The locking device as claimed in claim 14, wherein said plunger includes a spring, said spring engaging said inner member to form a yieldable connection therebetween.

16. The locking device of claim 14, wherein said handle is connected to said outer member for movement about a first pivot connection, said handle being connected to said plunger for movement about a second pivot connection offset from the first pivot connection whereby said handle pivots to move the plunger a predetermined distance within said housing.

17. The locking device of claim 14, wherein said handle is connected to said outer member for movement about a first pivot connection, said handle being connected to said plunger for movement about a second pivot connection offset from the first pivot connection to permit movement of said second pivot connection from a position in which the first pivot connection is disposed between the second pivot connection and the plunger when the handle is in the unlatched position to an overcenter position in which the second pivot connection is between the first pivot connection and the plunger when the handle is moved to the latched position.

18. The locking device of claim 17, wherein said first pivot connection pivotally connects said handle to a pair of plates extending from one end of the outer member, said plunger extending between said plates, the inner member extending from the other end of the outer member.

19. The locking device of claim 13, wherein a foot is secured to said inner member via an adjustable connection for engagement with the other living area, whereby the length of said locking device may be adjusted to adjust the fit of the locking device.

\* \* \* \* \*